(12) United States Patent
Joshi et al.

(10) Patent No.: US 9,810,563 B2
(45) Date of Patent: *Nov. 7, 2017

(54) FLOW METER HAVING ELECTRONIC ENCLOSURE ASSEMBLY

(71) Applicant: DANIEL MEASUREMENT & CONTROL, INC., Houston, TX (US)

(72) Inventors: Padmanabh Jagadish Joshi, Pune (IN); Randeep Grewal, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/926,563

(22) Filed: Oct. 29, 2015

(65) Prior Publication Data

US 2017/0030756 A1 Feb. 2, 2017

(30) Foreign Application Priority Data

Jul. 30, 2015 (IN) .......................... 2889/MUM/2015

(51) Int. Cl.
*G01F 15/14* (2006.01)
*G01F 1/66* (2006.01)
*G01F 15/18* (2006.01)

(52) U.S. Cl.
CPC .............. *G01F 15/14* (2013.01); *G01F 1/662* (2013.01); *G01F 15/18* (2013.01)

(58) Field of Classification Search
CPC ................................. G01F 15/14; G01F 1/662
See application file for complete search history.

(56) References Cited

U.S. PATENT DOCUMENTS

2013/0180340 A1* 7/2013 Allen ...................... G01F 1/667
  73/861.18
2016/0370215 A1* 12/2016 Satou ........................ G01F 1/66

* cited by examiner

*Primary Examiner* — Clayton E Laballe
*Assistant Examiner* — Dennis Hancock
(74) *Attorney, Agent, or Firm* — Conley Rose, P.C.

(57) ABSTRACT

A flow meter includes a meter body including a longitudinal axis, an outer surface, and a fluid passageway therethrough, and a plurality of electronics housings supported on the meter body by an enclosure assembly, wherein the enclosure assembly includes a base supported by the meter body, a tubular member having a passage for the passing of a transducer cable, a bracket member coupled to the tubular member, the bracket member having a pair of longitudinally extending sides, a pair of laterally extending sides at longitudinal ends of the bracket member, and a conduit member extending between the longitudinally extending sides.

20 Claims, 12 Drawing Sheets

FLOW METER HAVING ELECTRONIC ENCLOSURE ASSEMBLY

CROSS-REFERENCE TO RELATED APPLICATIONS

This application claims benefit of priority to Indian Patent Application Serial No. 2889/MUM/2015 filed in the Indian Patent Office on Jul. 30, 2015, and entitled "Flow Meter Having Electronic Enclosure Assembly," which is hereby incorporated herein by reference in its entirety. The aforementioned Patent filing was made pursuant to USPTO Foreign Filing License No. 556,479 granted on Jun. 15, 2015.

STATEMENT REGARDING FEDERALLY SPONSORED RESEARCH OR DEVELOPMENT

Not applicable.

BACKGROUND

This disclosure relates generally to liquid and gas flow meters. More particularly, it relates to apparatus and systems for enclosing and protecting transducers and transducer cables that are employed with ultrasonic flow meters.

Hydrocarbons, in both liquid and gas phases, are transported from place to place via pipelines. It is desirable to accurately know the amount of fluid flowing in the stream, particularly when the fluid is changing hands, an event referred to as "custody transfer." Even where custody transfer is not taking place, measurement accuracy is desirable, and in these situations, ultrasonic flow meters are commonly used.

An ultrasonic flow meter includes a meter body having a central conduit that serves as a fluid passageway for conducting the fluid (liquid or gas) that is being transported in the pipeline, and a pair of flanges for connecting the meter between aligned sections of the pipeline. The body of the flow meter may also be referred to as a spool piece. The ultrasonic flow meter further includes two or more transducer assemblies, each secured in a dedicated port that is formed in the meter body. To measure fluid flow through the meter, the transducer assemblies of the pair are positioned such that the piezoelectric elements of the transducers are adjacent to the inner surface of the spool piece, and such that each transducer faces the other of the pair, which is positioned on the opposite side of the fluid passageway. The transducer assemblies transmit and receive electric signals back-and-forth across the fluid stream.

Each transducer assembly is coupled to a cable that extends from an end connector of the assembly to a remote location, typically an electronics enclosure mounted on or adjacent to the spool piece. The electric signals created by the piezoelectric element of each transducer assembly is carried by the cable to an acquisition circuit board housed within the electronics enclosure, where the signal may be processed and subsequently used to determine useful data including the rate and volume of fluid flow through the flow meter.

If left exposed, the transducers and cables are susceptible to being tampered with and becoming damaged by falling debris, roaming livestock, and vandals. Further, if left unprotected, the cables and transducers are exposed to possible damage during shipping and installation. Further, the cables' insulation can degrade due to constant exposure to weather and sunlight. Consequently, it has been common to employ robust and thus relatively expensive cables in an attempt to resist damage and degradation.

Additionally, attempts have been made to manufacture meter bodies having internal cable passageways that are formed in the walls of the meter body to at least partially cover the cables and provide some degree of protection. In some such products, the ends of the transducer assemblies and portions of the cables are nevertheless still exposed. This arrangement leaves them susceptible to damage or to being tampered with, which may limit the meter's performance in accurately measuring the fluid flow. Other flow meters have included covers intended to completely enclose and protect the transducers and the cables; however, some such covers have had intricate designs that create manufacturing and cable-routing challenges and increased cost.

Other cover designs have required that the transducer assemblies be mounted in deep pockets formed in the meter body so as to limit the extension height of the transducer assemblies above the body's surface. This has required the use of significantly larger meter bodies with thicker walls, larger diameters, and/or greater flange-to-flange length that, in turn, leads to increased weight and cost. Still other covers have been flexible to a degree that creates some difficulty in removing and then properly reinstalling the cover in the field, or have required fasteners that are inconvenient or difficult to install and remove.

SUMMARY OF THE DISCLOSURE

An embodiment of a flow meter comprises a meter body comprising a longitudinal axis, an outer surface, and a fluid passageway therethrough, and a plurality of electronics housings supported on the meter body by an enclosure assembly, wherein the enclosure assembly comprises a base supported by the outer surface of the meter body, a tubular member extending from the base, the tubular member having a passage extending therethrough for the passing of a transducer cable, a bracket member coupled to the tubular member distal the base, the bracket member having a pair of longitudinally extending sides, a pair of laterally extending sides at longitudinal ends of the bracket member, and a conduit member extending between the longitudinally extending sides. In an embodiment, the conduit member is centrally disposed relative the longitudinal ends of the bracket member and comprises an internal conduit chamber open to the passage of the tubular member. In an embodiment, the bracket member comprises a pair of outer conduit chambers, wherein each outer conduit chamber is disposed between a longitudinal end of the bracket member and the conduit member. In this embodiment, the conduit member may further comprise a pair of lateral sides, wherein each lateral side comprises an aperture extending between the internal conduit chamber and an outer conduit chamber. In this embodiment, the flow meter may further comprise a pair of upper mounting plates seated on an upper surface of the bracket member, wherein each upper mounting plate encloses an outer conduit chamber of the bracket member. In an embodiment, each upper mounting plate comprises an aperture extending therethrough for the passage of a transducer cable. In an embodiment, each mounting plate is configured to releasably couple with an electronics housing in signal communication with a transducer assembly of the flow meter. In this embodiment, each upper mounting plate may comprise a sealing groove to receive a gasket disposed between the upper mounting plate and a corresponding electronics housing. In this embodiment, the flow meter may further comprise a transducer cable having a first end coupled to the transducer assembly and a second end extending into the electronics housing, the transducer cable extending through the passage of the tubular member and into the internal conduit chamber, through an aperture of the conduit member into an outer conduit chamber, and into an electronics housing via the aperture in an upper mounting plate. In an embodiment, the flow meter may further comprise a groove extending longitudinally along the outer surface of the meter body, the groove extending underneath the base of the enclosure assembly.

An embodiment of a flow meter comprises a meter body comprising a longitudinal axis, an outer surface and a fluid passageway therethrough, and a pair of electronics housings supported on the meter body by an enclosure assembly, wherein the enclosure assembly comprises a base supported by the outer surface of the meter body, a tubular member extending from the base, the tubular member having a passage extending therethrough for the passing of a transducer cable, a bracket member coupled to the tubular member distal the base, and a pair of upper mounting plates seated on the bracket member, wherein each upper mounting plate is configured to releasably couple with an electronics housing. In an embodiment, the bracket member comprises a pair of longitudinally extending sides, a pair of laterally extending sides at longitudinal ends of the bracket member, and a conduit member extending between the longitudinally extending sides. In an embodiment, the conduit member is centrally disposed relative the longitudinal ends of the bracket member and comprises an internal conduit chamber open to the passage of the tubular member. In this embodiment, the bracket member may comprise a pair of outer conduit chambers, wherein each outer conduit chamber is disposed between a longitudinal end of the bracket member and the conduit member. In this embodiment, the conduit member may comprise a pair of lateral sides, wherein each lateral side comprises an aperture extending between the internal conduit chamber and an outer conduit chamber. In an embodiment, each upper mounting plate encloses an outer conduit chamber of the bracket member. In an embodiment, each upper mounting plate comprises an aperture extending therethrough for the passage of a transducer cable. In this embodiment, each upper mounting plate may comprise a sealing groove to receive a gasket disposed between the upper mounting plate and a corresponding electronics housing. In this embodiment, the flow meter may further comprise a transducer cable having a first end coupled to the transducer assembly and a second end extending into the electronics housing, the transducer cable extending through the passage of the tubular member and into the internal conduit chamber, through an aperture of the conduit member into an outer conduit chamber, and into an electronics housing via the aperture in an upper mounting plate. In an embodiment, the flow meter further comprises a groove extending longitudinally along the outer surface of the meter body, the groove extending underneath the base of the enclosure assembly.

BRIEF DESCRIPTION OF THE DRAWINGS

For a detailed description of the disclosed exemplary embodiments, reference will now be made to the accompanying drawings in which.

DETAILED DESCRIPTION OF THE DISCLOSED EXEMPLARY EMBODIMENTS

The following description is exemplary of embodiments of the disclosure. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment. The drawing figures are not necessarily to scale. Certain features and components disclosed herein may be shown exaggerated in scale or in somewhat schematic form, and some details of conventional elements may not be shown in the interest of clarity and conciseness. In some of the figures, one or more components or aspects of a component may be not displayed or may not have reference numerals identifying the features or components that are identified elsewhere in order to improve clarity and conciseness of the figure.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. If the connection transfers electrical power or signals, the coupling may be through wires or through one or more modes of wireless electromagnetic transmission, for example, radio frequency, microwave, optical, or another mode. In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis.

Figure 1:
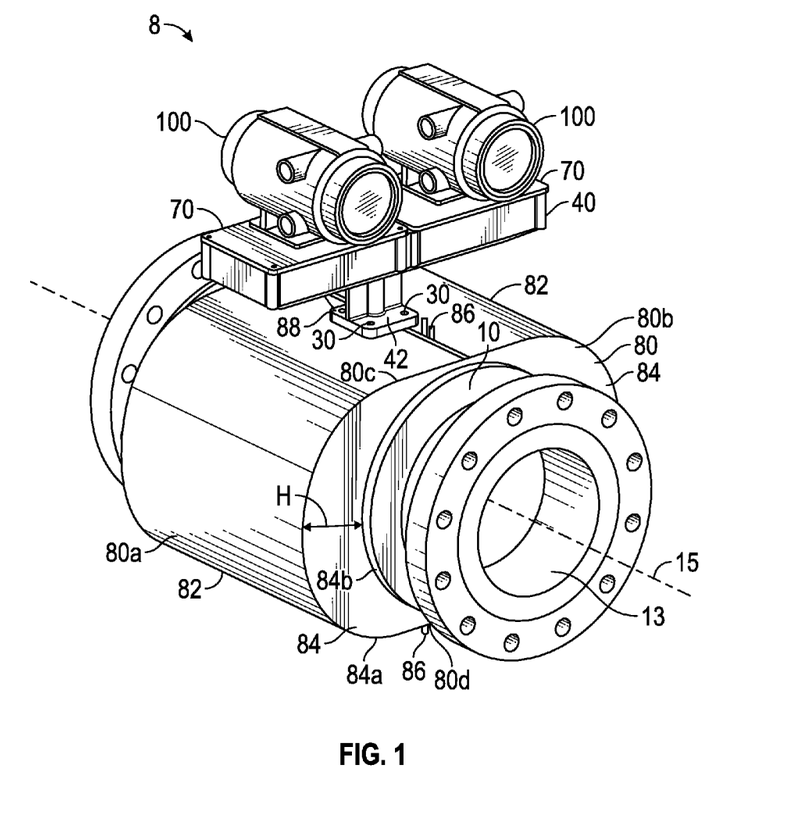
FIG. 1 is a perspective view of an embodiment of an ultrasonic flow meter including an embodiment of an electronic enclosure mount assembly and a protective shroud in accordance with principles described herein.
Figure 2:
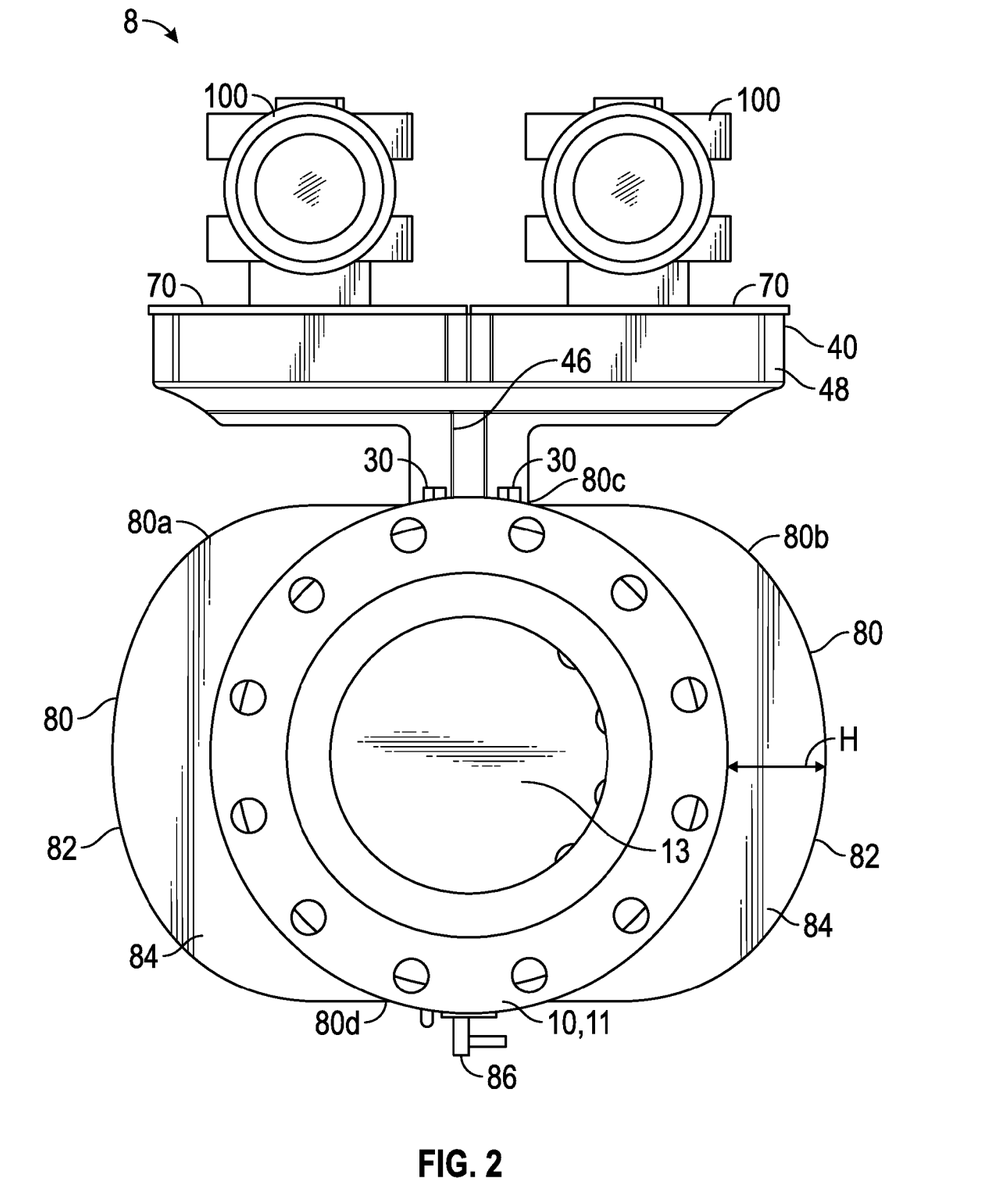
FIG. 2 is a side view of the ultrasonic flow meter of FIG. 1.

Referring now to FIGS. 1 and 2, an exemplary embodiment of an ultrasonic flow meter 8 made in accordance with principles disclosed herein includes a meter body or spool piece 10 that is suitable for placement between aligned sections of a pipeline, and includes a central flow passage 13 through which fluid flow may be measured. Typically, meter body 10 is forged and then machined to its final form; however, it may be manufactured by any suitable technique. In this embodiment, flow meter 8 further includes a central or longitudinal axis 15, an electronic enclosure mount assembly 40, a protective shroud 80 disposed about meter body 10, and a pair of electronics housings 100. Enclosure assembly 40 couples to and supports each electronics housing 100.

Referring to FIGS. 1-4, ultrasonic flow meter 8 is shown with shroud 80 removed, for clarity. Flow meter 8 includes a plurality of transducer assemblies 26 coupled to meter body 10 and transducer cables 25 extending from transducer assemblies 26 to an electronics housing 100. Meter body 10 has a central or longitudinal axis coaxial with meter axis 15 and generally includes a central tubular section 12 disposed axially between a pair of flanges 11, where each flange is configured for connection to corresponding flanges (not shown) on the pipeline sections. Tubular section 12 includes a first axial end 12a coupled to a first flange 11 and a second axial end 12b coupled to a second flange 11. As shown best in FIG. 4 where flanges 11 are hidden, tubular section 12 of body 10 includes a curved and generally cylindrical outer surface 14 bounded by a pair of curved, circumferentially extending channels or grooves 14a, with one circumferential groove 14a disposed proximal an end (12a and 12b) of tubular section 12. Circumferential grooves 14a are provided to receive edges of the shroud 80, as explained in more detail below.

Figure 3:
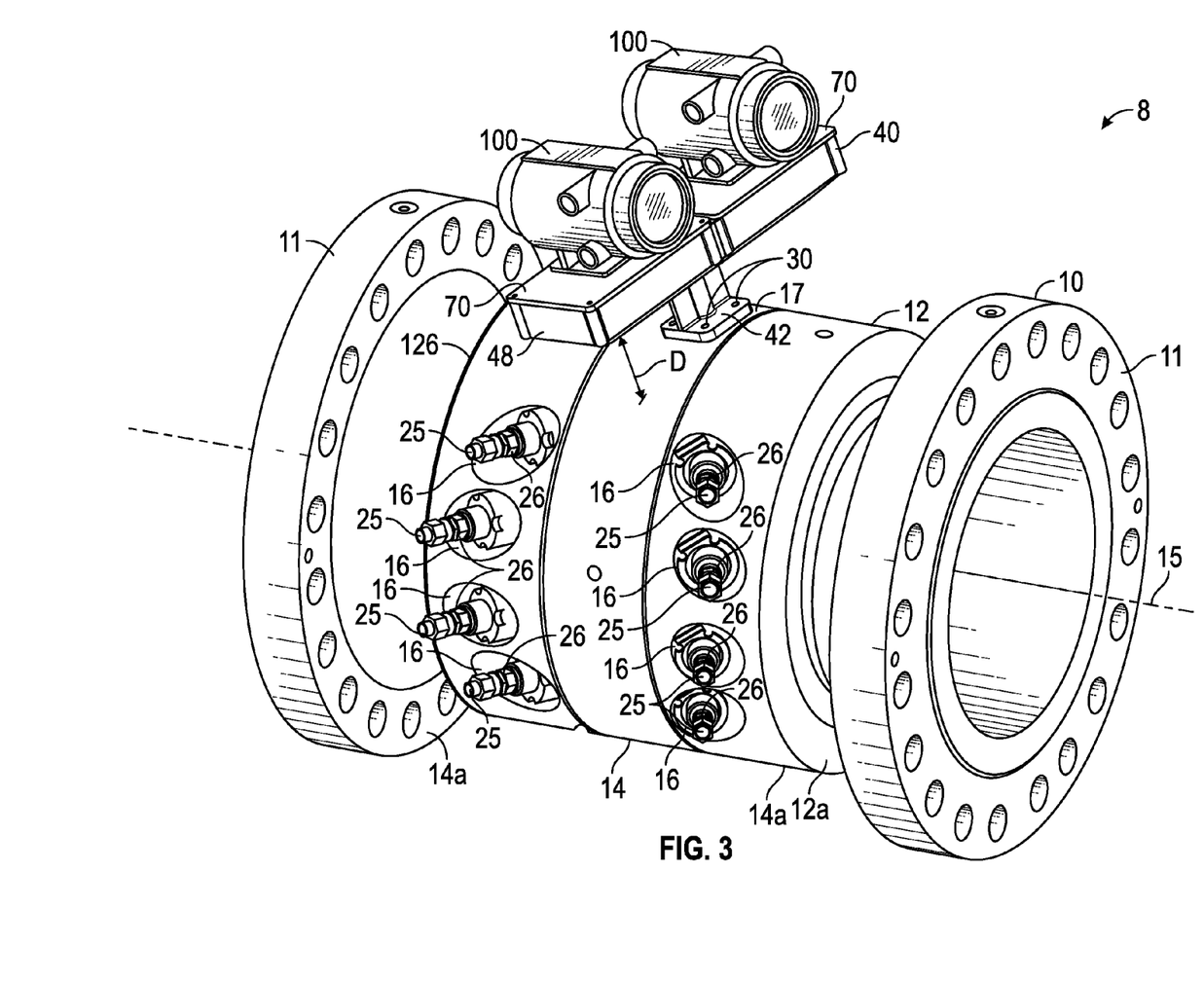
FIG. 3 is a perspective view of the ultrasonic flow meter of FIG. 1 shown with the shroud removed.
Figure 4:
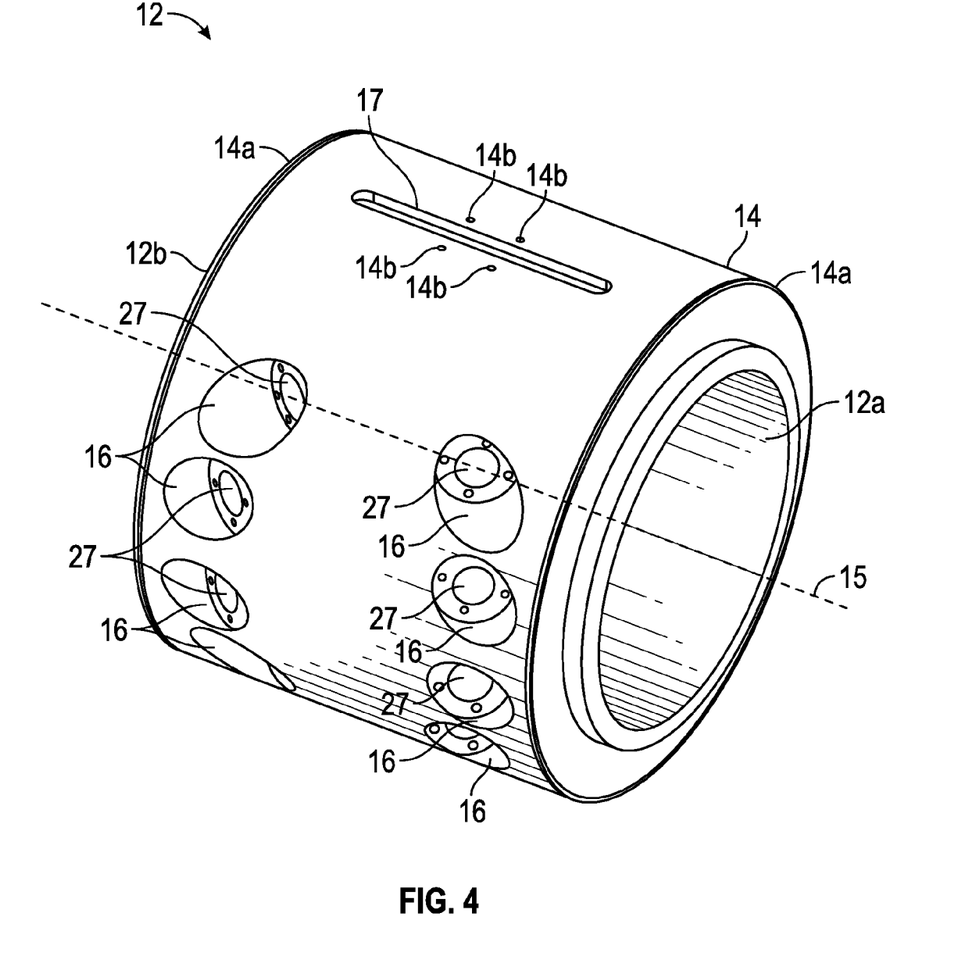
FIG. 4 is a perspective view of a central tubular section of a meter body of the ultrasonic flow meter of FIG. 1 in accordance with principles described herein.

As shown particularly in FIGS. 3 and 4, outer surface 14 includes a plurality of circumferentially spaced pockets 16. Each pocket 16 includes a bore or port that extends radially from outer surface 14 to central flow passage 13. Transducer assemblies 26 (shown in FIG. 3) are received and secured in ports 27 (shown in FIG. 4) and are electrically coupled to circuitry within electronics housing 100 via cables 25 (shown in FIG. 3). For brevity, as used herein, "transducer assembly" may be referenced herein simply as "transducer." Outer surface 14 also includes a longitudinally-extending channel 17 (shown in FIG. 3) disposed parallel with axis 15, and is circumferentially spaced from pockets 16.

A transducer 26 is retained within each transducer pocket 16, and each transducer 26 engages a port 27 and is sealed to prevent fluid from escaping central flow passage 13. A transducer cable 25 extends between the transducer 26 and electronics housing 100 via the outer surface 14 and longitudinal channel 17, and electrically couples the transducer 26 to circuits that are housed in the electronics housings 100. In the embodiment shown in FIGS. 3 and 4, outer surface 14 supports eight transducers 26 (four on each side of the meter body 10), and eight cables 25 that terminate in one of the electronics housings 100. While in this embodiment ultrasonic flowmeter 8 includes eight transducers 26, with each transducer 26 coupled to a transducer cable 25, in other embodiments ultrasonic flowmeter 8 could include varying numbers of transducers 26 and cables 25. Further, in other embodiments ultrasonic flowmeter 8 may include transducer cables 25 that extend between two transducers 26 instead of extending between a transducer 26 and the electronics housings 100, and accordingly, the number of transducers 26 may be greater than the number of cables 25 extending between a transducer 26 and electronics housings 100. As will be explained further herein, shroud 80 is configured to protect transducers 26 and cables 25 as the cables extend between transducers 26 and electronics housings 100.

Referring to FIGS. 1 and 2, each protective shroud 80 generally includes a pair of partial or U-shaped shroud members 80a and 80b that are fitted about the meter body 10 and couple with one another to form an annular chamber between outer surface 14 of body 12 and an inner surface of shroud 80 which, as described below, serves as a wireway for managing and protecting the transducer cables 25. Each partial shroud member 80a, 80b spans approximately 180° of the outer surface 14 of the meter body 10, and extends from a first or upper end 80c to a second or lower end 80d.

In more detail, each partial shroud member 80a, 80b includes a curved outer strip 82 attached to a pair of side members 84, with the curved outer strip 82 having an axial width such that an inner edge 84i of each side member 84 fits or is received within one of the circumferential grooves 14a formed in the meter body's outer surface 14. Thus, the inner edge 84i of each side member 84 is curved to substantially match the curvature of groove 14a. An outer edge 84o of each side member 84 is coupled to the outer strip 82 and has a radius of curvature that varies along its length as it extends between upper and lower ends 80c, 80d. An annular chamber is thus formed and bounded by the pair of side members 84 and outer strip 82 of each shroud member 80a, 80b and by the meter body's outer surface 14

The distance as measured radially from inner edge 84i to outer edge 84o defines the height H of the side member 84, and such height H varies from a minimum dimension to a maximum dimension. The partial shroud members 80a, 80b are positioned about the meter body 10 such that, in this embodiment shown in FIGS. 1 and 2, the portion of the side member 84 having the maximum height H is generally on the lateral sides of the meter body, disposed circumferentially equidistant between upper and lower ends 80c and 80d, while the portion having the minimum height H is generally positioned 180° apart, proximal the upper end 80c and lower end 80d of protective shroud 80. However, in other embodiments the portion of the side member 84 having the maximum height H may be disposed at other positions on the meter body 10, such as at the bottom of body 10. Moreover, in other embodiments the ultrasonic flow meter 8 may include a plurality of axially spaced protective shrouds in lieu of a single protective shroud 80.

Upper ends 80c of each partial shroud member 80a, 80b are configured to releasably interlock with one another via facing or mating surfaces (not shown) at upper and lower ends 80c and 80d. Protective shroud 80 is further configured to be secured about the outer surface 14 of tubular section 12 of the meter body 10. Specifically, the inner radial edge 84i of each side member 84 is received within a circumferential groove 14a of outer surface 14. The engagement between circumferential grooves 14a and the side members 84 helps secure each partial shroud member 80a, 80b in its axial position (relative to central axis 15) and ensure that outer surface 14 remains covered. In this manner, each transducer cable 25 may extend from a transducer 26 to the longitudinal channel 17 of central tubular section 12 via the annular chamber disposed within protective shroud 80 and thereby remain protected from outside influences.

To secure shroud 80 about meter body 10, each partial shroud member 80a, 80b includes a pair of axially spaced releasable buckle fastener 86 disposed at upper and lower ends 80c and 80d. The upper end 80c of protective shroud 80 further includes a rectangular aperture 88 for receiving the electronic enclosure assembly 40, which is disposed approximately axially equidistant between side members 84. Particularly, upper end 80c includes a buckle fastener 86 disposed axially between rectangular aperture 88 and each side member 84, with lower end 80d also including a pair of buckle fasteners 86 axially aligned with the buckle fasteners 86 at upper end 80c.

In the embodiment of FIGS. 1 and 2, each latch connector 86 generally includes a biased or spring loaded hasp connector and a corresponding hook connector that releasably couples with the hasp connector to form buckle fastener 86. For instance, the upper end 80c of shroud member 80a may include a pair of hasp connectors while the upper end 80c of shroud member 80b may include a pair of hook connectors releasably connectable with the corresponding hasp connectors of upper end 80c of member 80a, thereby forming a pair of buckle fasteners 86 at upper end 80c of protective shroud 80. Similarly, the lower end 80d of shroud member 80a may include a pair of hook connectors while the lower end 80d of shroud member 80b may include a pair of hasp connectors releasably connectable with the corresponding hook connectors at lower end 80d of member 80a, thereby forming a pair of buckle fasteners 86 at lower end 80d of protective shroud 80. Although the embodiment shown in FIGS. 1 and 2 includes buckle fastener 86 for coupling members 80a and 80b, in other embodiments other releasable connectors or latching mechanisms known in the art may be used to couple partial shroud members 80a and 80b to form an assembled protective shroud 80.

Referring to FIGS. 3, 4, and 5A-5C, each transducer cable 25 passes from longitudinal channel 17 into an electronics housing 100 via enclosure assembly 40, which is coupled to the outer surface 14 of the central tubular section 12 of meter body 10. Enclosure assembly 40 is generally configured to protect each transducer cable 25 as it passes from longitudinal channel 17 to electronics housing 100, and to support each electronics housing 100. Enclosure assembly 40, which may also be described herein as a mounting member or mounting bracket, has a central or longitudinal axis 45 that is normal to central axis 15 of ultrasonic flow meter 8 and generally includes a rectangular base or lower bracket 42, a pair of supporting flanges 44, a tubular member 46 disposed coaxially with central axis 45, a rectangular upper bracket 48, and a pair of upper mounting plates 70 releasably coupled to upper bracket 48.

In this embodiment, lower bracket 42 is configured to releasably couple enclosure assembly 40 to the central tubular section 12 of meter body 10 and includes a plurality of apertures 42a extending therethrough, with each aperture 42a configured to receive a threaded fastener 30 (FIGS. 1-3). Also, each aperture 42a may be aligned with a corresponding aperture 14e (FIG. 4) extending into outer surface 14 of central tubular section 12 of meter body 10. In this manner, a threaded fastener 30 may be extended through a corresponding aperture 42a of lower bracket 42 and into a corresponding aperture 14e, as shown in FIGS. 1-3, thereby securing enclosure assembly 40 to meter body 10. Further, a gasket (not shown) may be disposed between the lower surface of base 42 and the outer surface 14 of tubular section 12 to provide a seal therebetween. While in the embodiment of FIGS. 1-3 the enclosure assembly 40 is coupled to meter body 10 via threaded fasteners 30, in other embodiments, enclosure assembly 40 may be coupled to meter body 10 using other kinds of fasteners or other fastening means known in the art.

Axially extending flanges 44 extend between lower bracket 42 and upper bracket 48. Each flange 44 includes a first or upper end 44a coupled to upper bracket 48 and a second or lower end 44b coupled to lower bracket 42. Tubular member 46, generally configured to serve as a conduit or wireway for the transducer cables 25, extends upward from lower bracket 42 and includes a first or upper end 46a displaced from bracket 42 and a second or lower end 46b coupled to lower bracket 42. Tubular member 46 also includes a generally cylindrical passage 46c (FIG. 5C) in which transducer cables 25 may pass through, and a general cylindrical outer surface 46d that couples to the radially inner end 44c of each axially extending flange 44.

Referring to FIGS. 5A-5C and 6A-6E, in this embodiment upper bracket 48 generally includes a pair of longitudinal ends 48a, a pair of longitudinally extending sides 50, a pair of laterally extending sides 52 at longitudinal ends 48a, and a laterally extending dividing or conduit member 54 that extends between longitudinally extending sides 50 and that is disposed approximately equidistant between longitudinal ends 48a. Upper bracket 48 further includes a base or bottom member 60 that extends between both longitudinally extending sides 50 and laterally extending sides 52. The conduit member 54 disposed between longitudinal ends 48a forms a pair of outer conduit chambers 55, one outer conduit chamber 55 being disposed on each side of conduit member 54. Each outer conduit chamber 55 is defined by the pair of longitudinally extending sides 50, a laterally extending side 52, the conduit member 54, and the base 60.

In the embodiment of FIGS. 5A-5C and 6A-6E the conduit member 54 generally includes a pair of laterally extending sides 54a oblique to central axis 45 and an internally disposed, generally trapezoidal central conduit chamber 56 that is open to cylindrical passage 46c of tubular member 46. Each laterally extending side 54a includes a generally cylindrical aperture 58 that provides a passage between each outer conduit chamber 55 and the central conduit chamber 56 of conduit member 54. As shown specifically in FIG. 5C, in this arrangement, transducer cables 25 from transducer assemblies 26 are allowed to pass between outer conduit chambers 55 and cylindrical passage 46c of tubular member 46 via central conduit chamber 56 and apertures 58.

In this embodiment, bottom 60 of upper bracket 48 includes chamfered corners 60a that couple with longitudinally extending sides 50 and laterally extending sides 52. Bottom 60 also includes a ridge 60b that extends longitudinally across a lower surface of bottom 60 between chamfers 60a, where ridge 60b of bottom 60 coupled with the upper end 46a of tubular member 46 and the upper ends 44a of flanges 44. Each laterally extending side 52 includes an upper edge 52a, and upper edge 52a includes an aperture 52b extending therein at the terminal ends of each laterally extending side 52 for releasably coupling with upper mounting plates 70. Conduit member 54 also includes an upper surface 54b having a pair of laterally spaced apertures 54c extending therein disposed at each longitudinal end of conduit member 54 for releasably coupling with upper mounting plates 70.

Figure 5A:
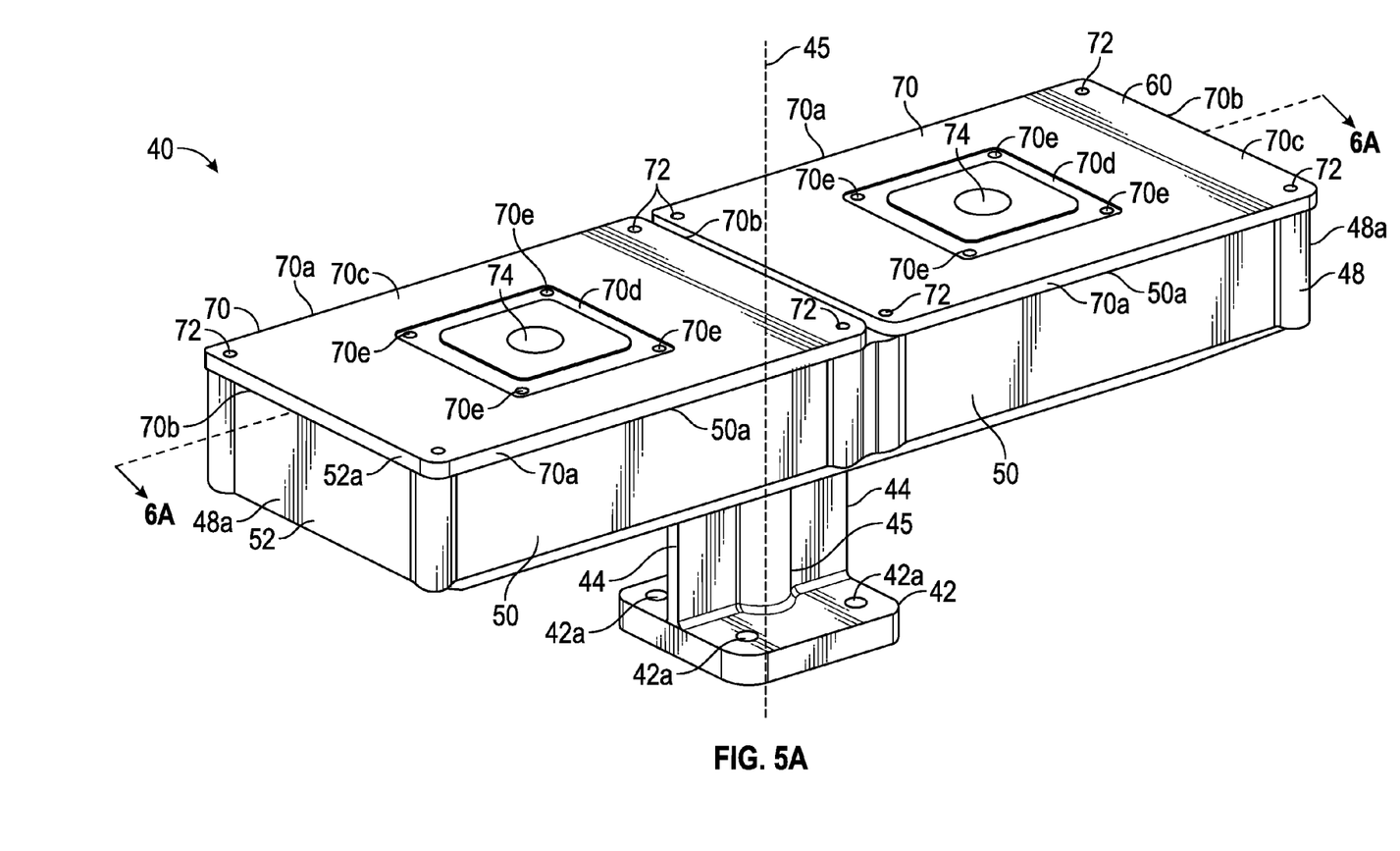
FIG. 5A is a perspective view of the electronic enclosure mount assembly, including upper mounting plates, of the ultrasonic flow meter of FIG. 1 in accordance with principles disclosed herein.
Figure 5B:
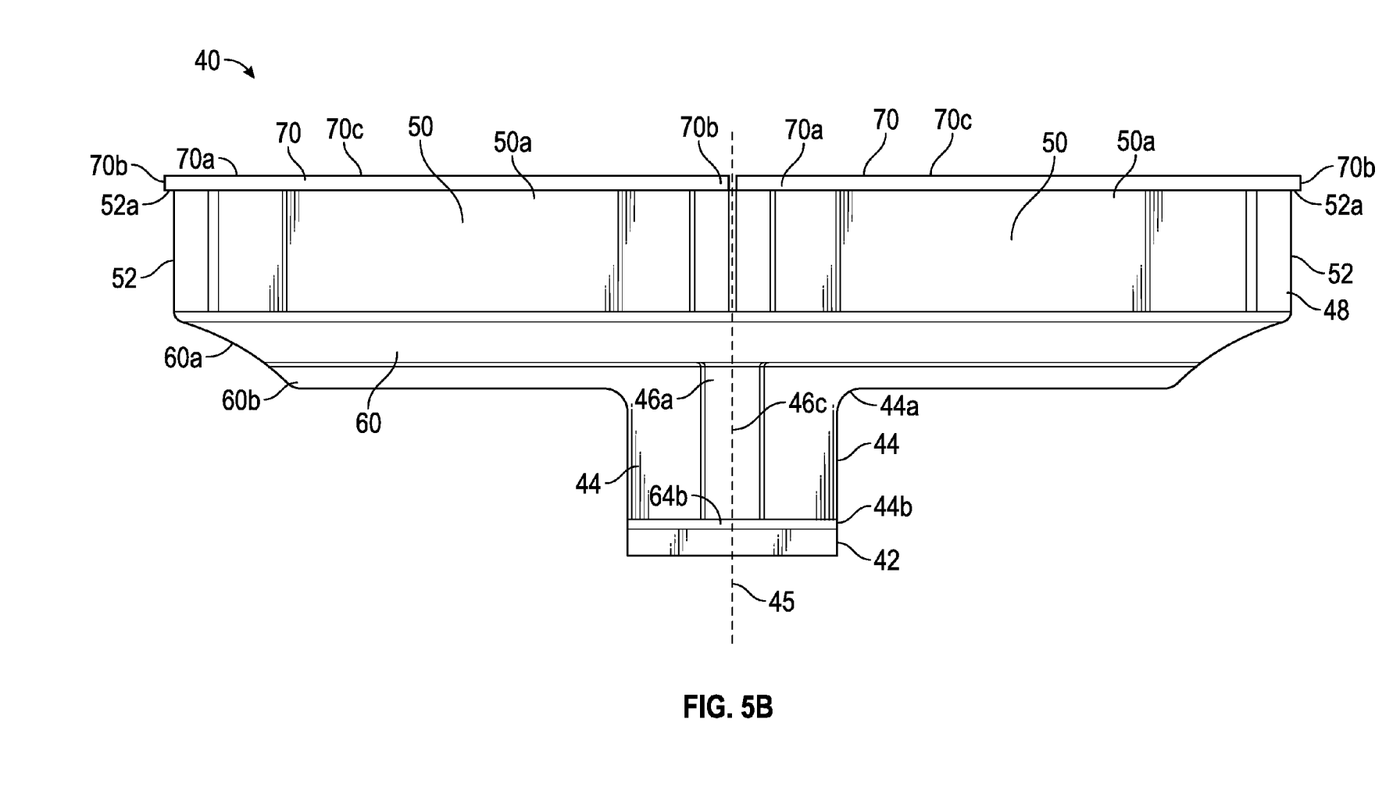
FIG. 5B is a front view of the electronic enclosure mount assembly, including upper mounting plates, of the ultrasonic flow meter of FIG. 1.
Figure 5C:
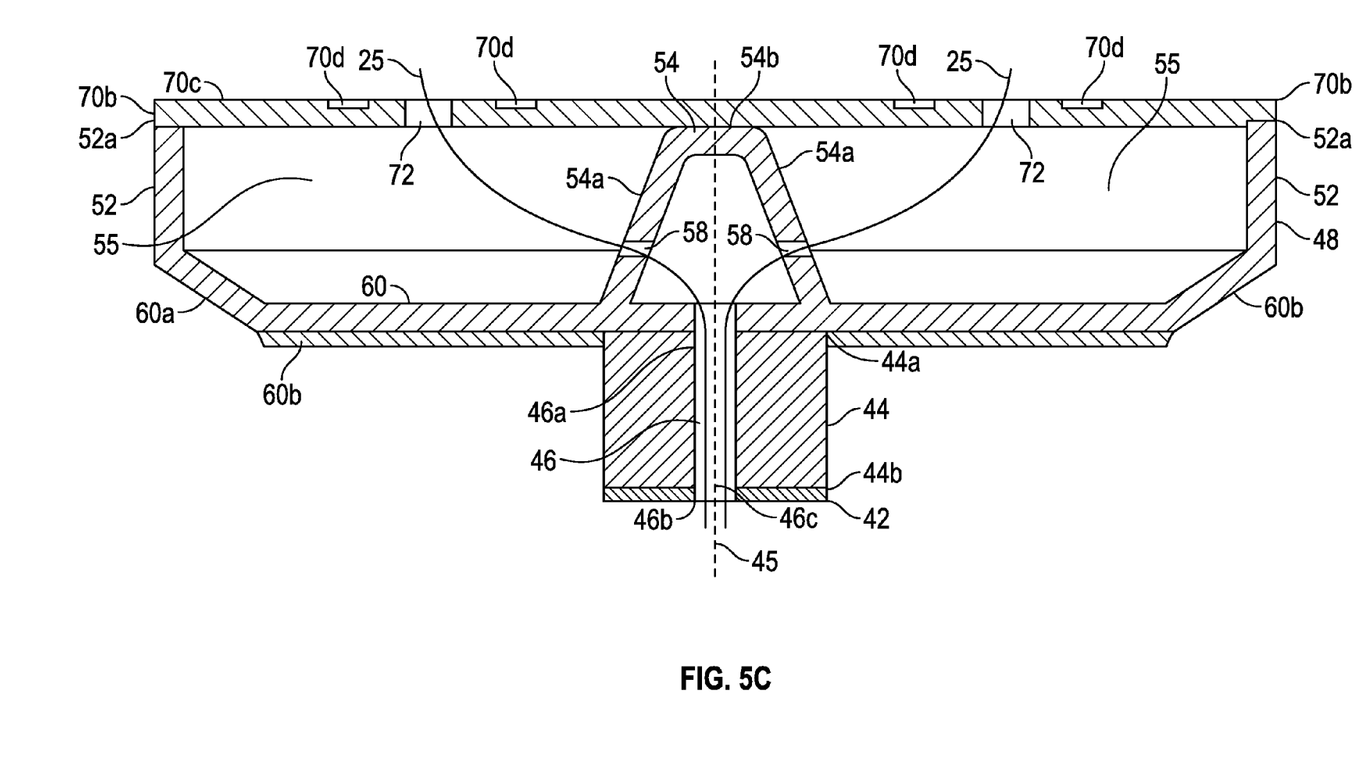
FIG. 5C is a front, cross-sectional view along line 6A-6A in FIG. 5A of the electronic enclosure mount assembly, including upper mounting plates, of the ultrasonic flow meter of FIG. 1.
Figure 6A:
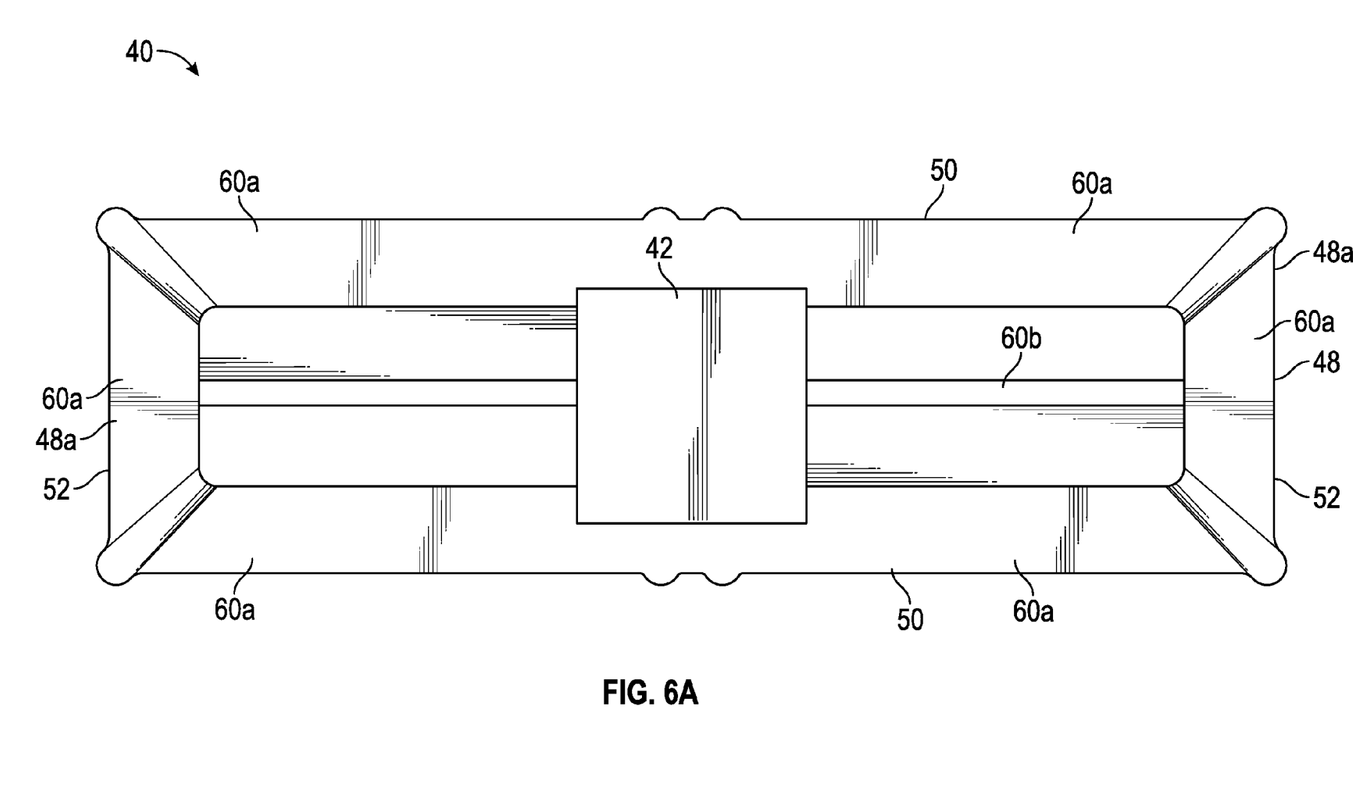
FIG. 6A is a bottom view of the electronic enclosure mount assembly, shown without upper mounting plates, of the ultrasonic flow meter of FIG. 1 in accordance with principles disclosed herein.
Figure 6B:
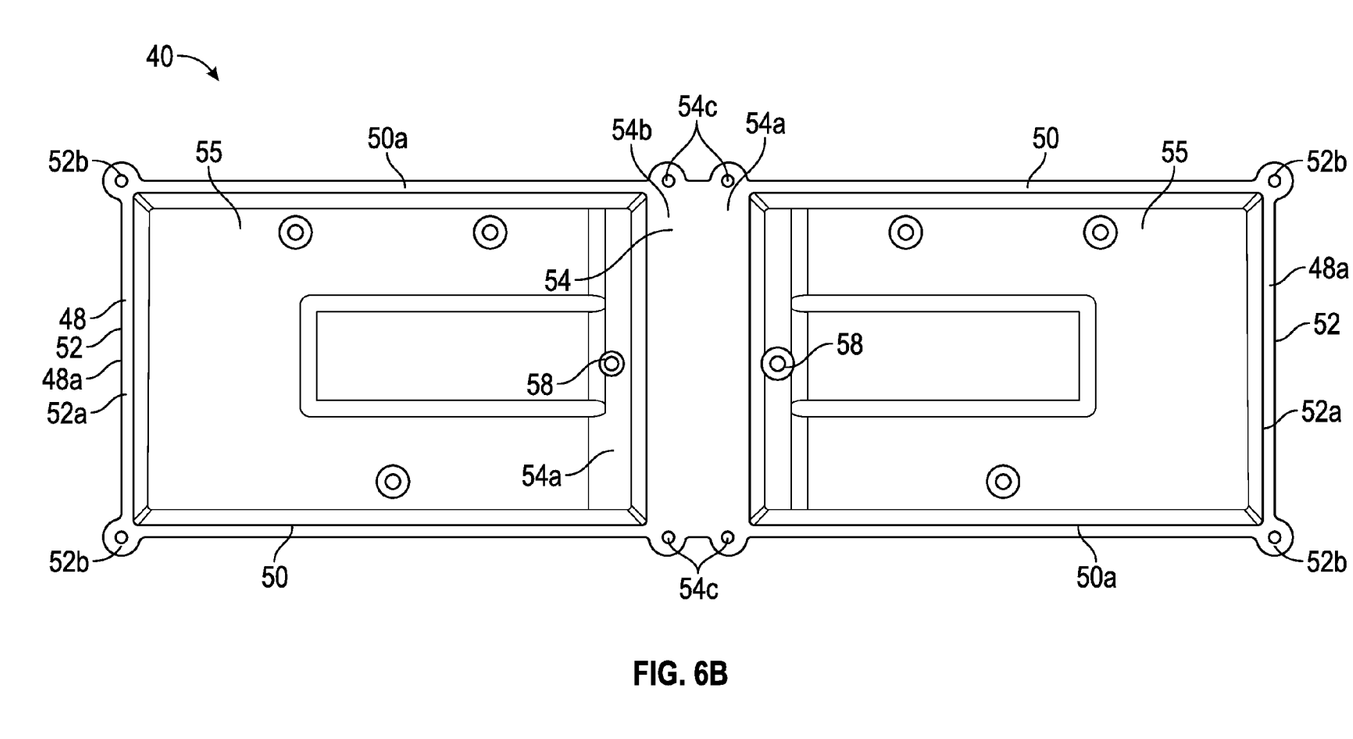
FIG. 6B is a top view of the electronic enclosure mount assembly, shown without upper mounting plates, of the ultrasonic flow meter of FIG. 1.
Figure 6C:
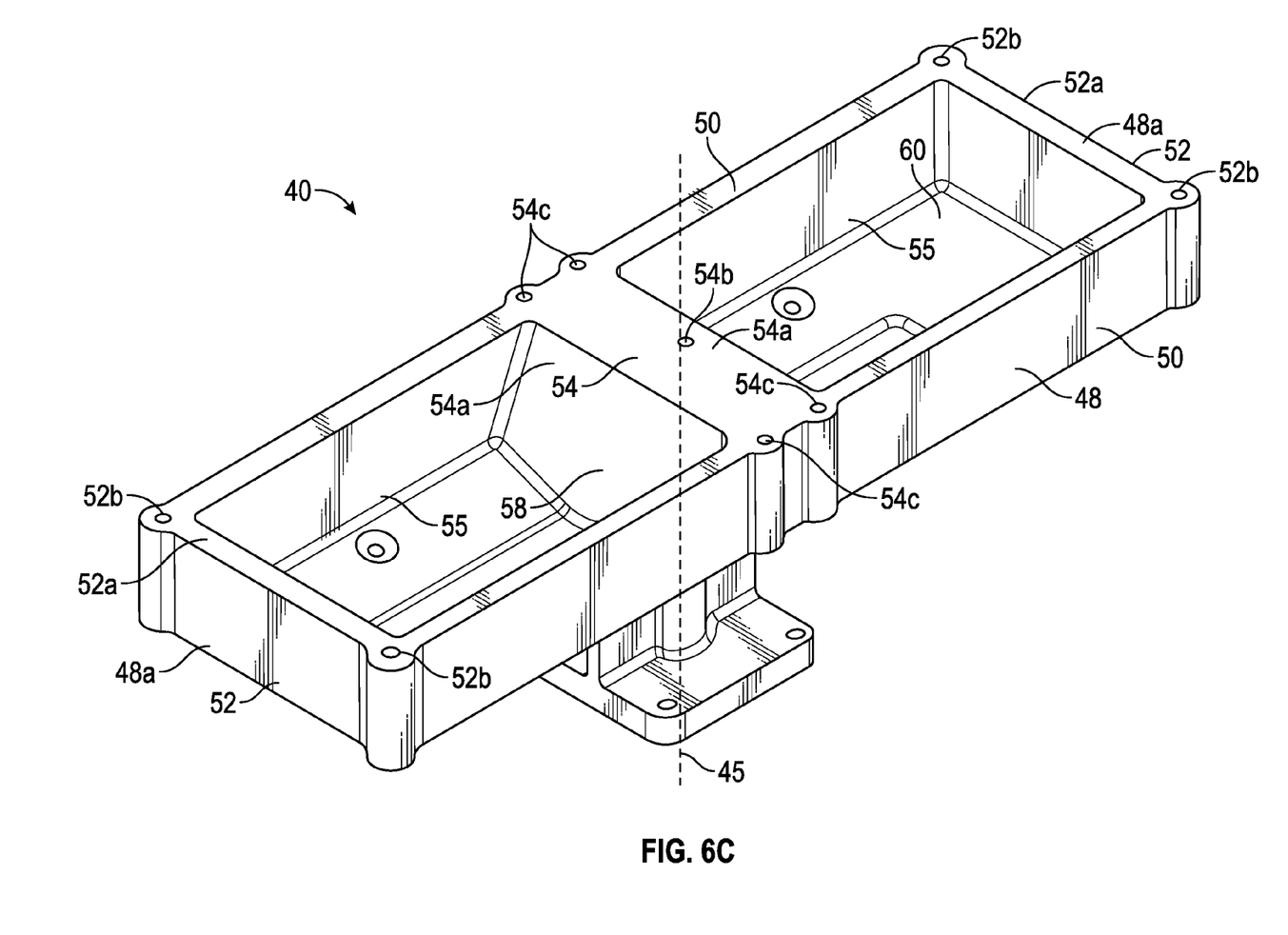
FIG. 6C is a perspective view of the electronic enclosure mount assembly, shown without upper mounting plates, of the ultrasonic flow meter of FIG. 1.
Figure 6D:
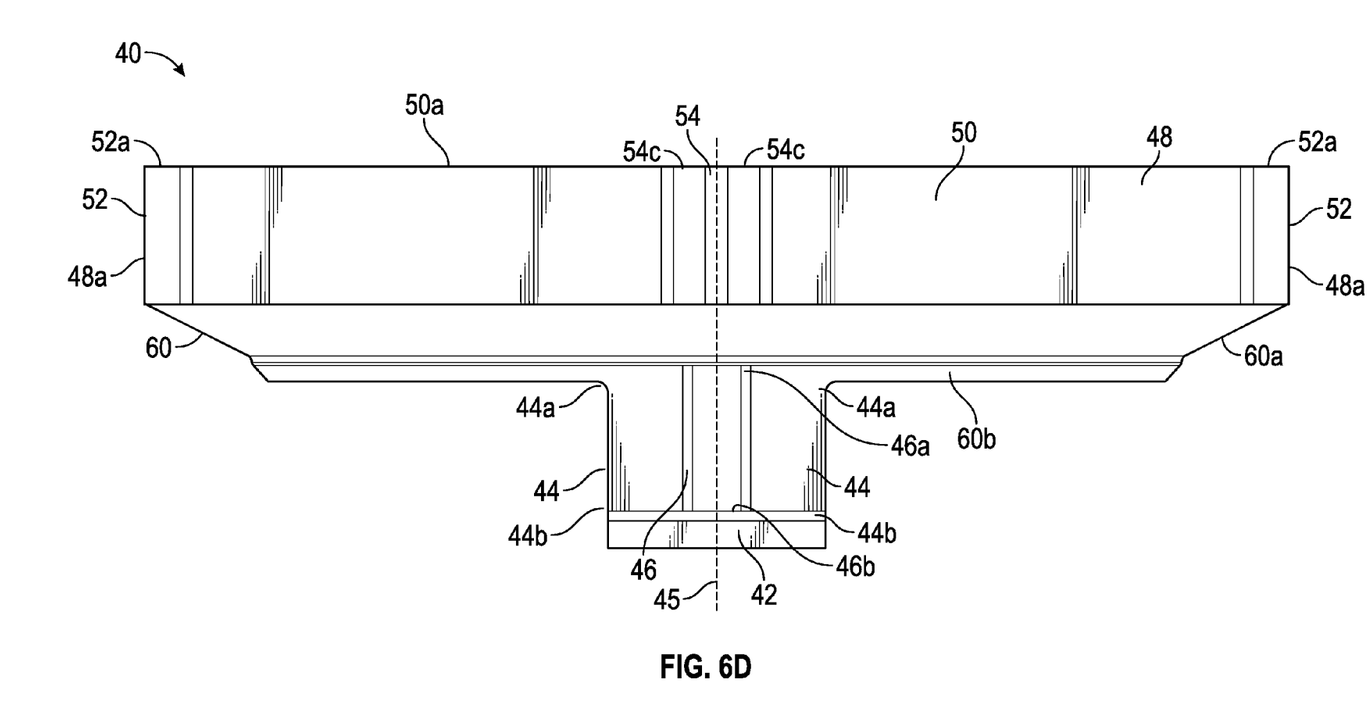
FIG. 6D is a front view of the electronic enclosure mount assembly, shown without upper mounting plates, of the ultrasonic flow meter of FIG. 1.
Figure 6E:
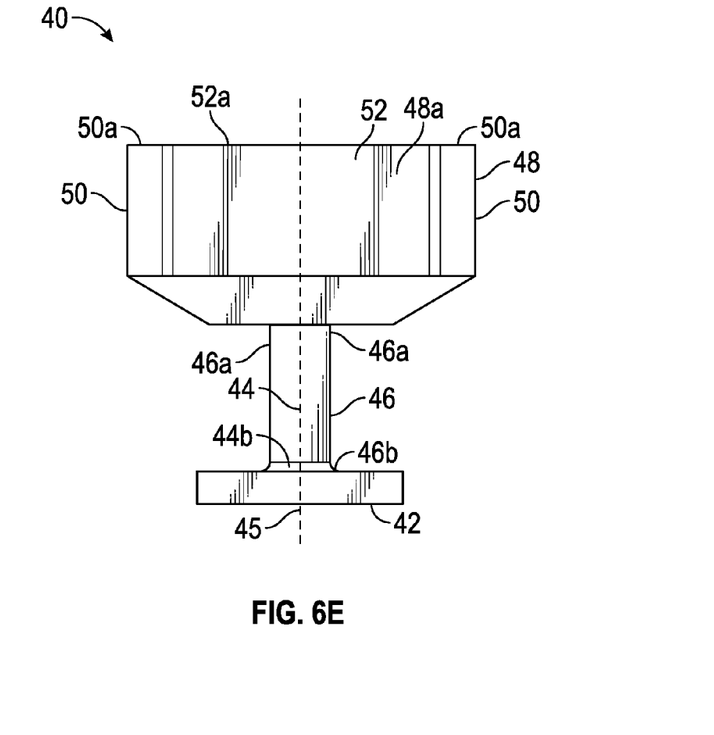
FIG. 6E is a side view of the electronic enclosure mount assembly, shown without upper mounting plates, of the ultrasonic flow meter of FIG. 1.

Referring to FIGS. 5A-5C, upper mounting plates 70 are configured to releasably couple with upper bracket 48 to enclose outer conduit chambers 55 and to support the electronics housings 100. Plates 70 include a pair of longitudinal edges 70a, a pair of lateral edges 70b, and a plurality of apertures 72 extending through plate 70, where one aperture 72 is disposed at each corner of plate 70 (i.e., at the intersection of each longitudinal edge 70a and lateral edge 70b). When upper mounting plates 70 are aligned with corresponding outer conduit chambers 55, the apertures 72 of each mounting plate 70 axially aligns with a corresponding aperture 52b of laterally extending sides 52 and apertures 54c of conduit member 54 of the upper bracket 48, as shown in FIGS. 5A-5C. In this arrangement, threaded fasteners 63 may be extended through corresponding and aligned apertures 72 and 52b, 54c, to releasably couple each upper mounting plate 70 to upper bracket 48.

While in the embodiment of FIGS. 5A-5C a threaded fastener 63 is used to couple upper mounting plates 70 with upper bracket 48, in other embodiments other fasteners known in the art may be used to either permanently or releasably couple upper mounting plates 70 to upper bracket 48. Moreover, in other embodiments upper mounting plates 70 may be formed integrally or monolithically with upper bracket 48. In an embodiment, a rectangular gasket or seal may be disposed or sandwiched between a lower surface of mounting plate 70 and the upper edges 50a, 52a, and 54b of longitudinally extending sides 50, laterally extending sides 52, and conduit member 54, respectively, to restrict water, dust, or other contaminants from entering outer conduit chambers 55.

In the embodiment of FIGS. 5A-5C, each upper mounting plate 70 includes a central port 74 that is disposed approximately equidistant between longitudinal edges 70a and lateral edges 70b. Port 74, as shown in FIG. 5C, provides for the passage of transducer cables 25 from outer conduit chambers 55 into electronics housings 100. Each upper mounting plate 70 also includes an upper surface 70c having a generally rectangular recess 70d extending therein, where recess 70d is centered about port 74. Disposed at each corner of rectangular recess 70d is a generally cylindrical aperture 70e for receiving a threaded fastener to releasably couple each upper mounting plate 70 to a corresponding electronics housing 100. For instance, the lower surface of each electronics housing 100 may include a plurality of apertures that may be aligned with apertures 70e of upper mounting plate 70, with a threaded fastener extending through the aperture of housing 100 and the corresponding aperture 70e of upper mounting plate 70 to releasably couple electronics housing 100 with upper mounting plate 70. In an embodiment, a generally rectangular gasket or seal (not shown) may be disposed in the rectangular recess 70d, such that the seal is sandwiched between recess 70d and a lower surface of electronics housing 100. In this arrangement, the rectangular seal is provided to restrict water, dust, or other contaminants from entering either electronics housing 100 or outer conduit chambers 55 of upper bracket member 48. Therefore, each transducer cable 25 may extend through cylindrical passage 46c of tubular member 46, into and through a chamber 62 of one of the removeable covers 54, and then through an aperture 50 of upper bracket 48, as shown in FIG. 16. In this manner, each transducer cable 25 is protected and isolated from the surrounding environment as it extends from longitudinal channel 17 of meter body 10 into the electronics housing 100.

Referring to FIGS. 1-6 and 21, electronic enclosure assembly 40 is configured to couple with and support two electronics housings 100. Moreover, electronic enclosure 40 distances electronics housings 100 from the meter body 10, thereby protecting the electronics housed within electronics housings 100 from possible high temperature flowing through flow passage 13 of meter body 10. Specifically, electronics housing 100 is disposed at a distance D (FIG. 3) from the outer surface 14 of the central tubular section 12 of meter body 10. Retained within electronics housing 100 are one or more terminal strips and circuit boards, to which transducer cables 25 couple. The bottom of each electronics housing 100 may include a first or central aperture aligned with a corresponding aperture 74 of an upper mounting plate 70 to allow for the passage of transducer cables 25 into electronics housing 100. Surrounding apertures in the bottom of each electronics housing 100 may be aligned with corresponding apertures 70e of an upper mounting plate 70 to allow for the passage of a threaded fastener therethrough to releasably couple each electronics housing 100 to an upper mounting plate 70 of electronic enclosure assembly 40.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. Accordingly, the scope of protection is not limited to the embodiments described herein, but is only limited by the claims that follow, the scope of which shall include all equivalents of the subject matter of the claims.

What is claimed is:

1. A flow meter comprising:
   a meter body comprising a longitudinal axis, an outer surface, and a fluid passageway therethrough; and
   a plurality of electronics housings supported on the meter body by an enclosure assembly, wherein the enclosure assembly comprises:
      a base supported by the outer surface of the meter body;
      a tubular member extending from the base, the tubular member having a passage extending therethrough for the passing of a transducer cable;
      a bracket member coupled to the tubular member distal the base, the bracket member having a pair of longitudinally extending sides, a pair of laterally extending sides at longitudinal ends of the bracket member, and a conduit member extending between the longitudinally extending sides.

2. The flow meter of claim 1, wherein the conduit member is centrally disposed relative the longitudinal ends of the bracket member and comprises an internal conduit chamber open to the passage of the tubular member.

3. The flow meter of claim 2, wherein the bracket member comprises a pair of outer conduit chambers, wherein each outer conduit chamber is disposed between a longitudinal end of the bracket member and the conduit member.

4. The flow meter of claim 3, wherein the conduit member comprises a pair of lateral sides, wherein each lateral side comprises an aperture extending between the internal conduit chamber and an outer conduit chamber.

5. The flow meter of claim 4, further comprising a pair of upper mounting plates seated on an upper surface of the bracket member, wherein each upper mounting plate encloses an outer conduit chamber of the bracket member.

6. The flow meter of claim 5, wherein each upper mounting plate comprises an aperture extending therethrough for the passage of a transducer cable.

7. The flow meter of claim 5, wherein each mounting plate is configured to releasably couple with an electronics housing in signal communication with a transducer assembly of the flow meter.

8. The flow meter of claim 7, wherein each upper mounting plate comprises a sealing groove to receive a gasket disposed between the upper mounting plate and a corresponding electronics housing.

9. The flow meter of claim 7, further comprising a transducer cable having a first end coupled to the transducer assembly and a second end extending into the electronics housing, the transducer cable extending through the passage of the tubular member and into the internal conduit chamber, through an aperture of the conduit member into an outer conduit chamber, and into an electronics housing via the aperture in an upper mounting plate.

10. The flow meter of claim 1, further comprising a groove extending longitudinally along the outer surface of the meter body, the groove extending underneath the base of the enclosure assembly.

11. A flow meter comprising:
a meter body comprising a longitudinal axis, an outer surface and a fluid passageway therethrough; and
a pair of electronics housings supported on the meter body by an enclosure assembly, wherein the enclosure assembly comprises:
a base supported by the outer surface of the meter body;
a tubular member extending from the base, the tubular member having a passage extending therethrough for the passing of a transducer cable;
a bracket member coupled to the tubular member distal the base; and
a pair of upper mounting plates seated on the bracket member, wherein each upper mounting plate is configured to releasably couple with an electronics housing.

12. The flow meter of claim 11, wherein the bracket member comprises a pair of longitudinally extending sides, a pair of laterally extending sides at longitudinal ends of the bracket member, and a conduit member extending between the longitudinally extending sides.

13. The flow meter of claim 12, wherein the conduit member is centrally disposed relative the longitudinal ends of the bracket member and comprises an internal conduit chamber open to the passage of the tubular member.

14. The flow meter of claim 13, wherein the bracket member comprises a pair of outer conduit chambers, wherein each outer conduit chamber is disposed between a longitudinal end of the bracket member and the conduit member.

15. The flow meter of claim 14, wherein the conduit member comprises a pair of lateral sides, wherein each lateral side comprises an aperture extending between the internal conduit chamber and an outer conduit chamber.

16. The flow meter of claim 14, wherein each upper mounting plate encloses an outer conduit chamber of the bracket member.

17. The flow meter of claim 15, wherein each upper mounting plate comprises an aperture extending therethrough for the passage of a transducer cable.

18. The flow meter of claim 11, wherein each upper mounting plate comprises a sealing groove to receive a gasket disposed between the upper mounting plate and a corresponding electronics housing.

19. The flow meter of claim 17, further comprising a transducer cable having a first end coupled to the transducer assembly and a second end extending into the electronics housing, the transducer cable extending through the passage of the tubular member and into the internal conduit chamber, through an aperture of the conduit member into an outer conduit chamber, and into an electronics housing via the aperture in an upper mounting plate.

20. The flow meter of claim 11, further comprising a groove extending longitudinally along the outer surface of the meter body, the groove extending underneath the base of the enclosure assembly.

* * * * *